(12) United States Patent
Barresi et al.

(10) Patent No.: US 11,701,763 B2
(45) Date of Patent: Jul. 18, 2023

(54) SAFE/FAST LOCKING/UNLOCKING TOOL FOR ENGINE TORSION VIBRATION DAMPER

(71) Applicant: GM GLOBAL TECHNOLOGY OPERATIONS LLC, Detroit, MI (US)

(72) Inventors: Antonino Barresi, Turin (IT); Gianfranco Badellino, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 263 days.

(21) Appl. No.: 17/074,586

(22) Filed: Oct. 19, 2020

(65) Prior Publication Data
US 2022/0118592 A1 Apr. 21, 2022

(51) Int. Cl.
*B25B 27/00* (2006.01)
*B25B 23/00* (2006.01)

(52) U.S. Cl.
CPC ...... *B25B 27/0035* (2013.01); *B25B 23/0085* (2013.01); *B23P 2700/07* (2013.01); *F16F 2226/04* (2013.01); *F16F 2230/0005* (2013.01)

(58) Field of Classification Search
CPC ... B25B 23/0085; B25B 13/105; B25B 13/48; B25B 13/50; B25B 27/0035; B23P 2700/07; F16F 2226/04
See application file for complete search history.

(56) References Cited

U.S. PATENT DOCUMENTS

| 3,731,560 | A  | * | 5/1973  | Bares ..................... | B25B 13/10 |
|           |    |   |         |                             | 81/176.15  |
| 4,237,755 | A  | * | 12/1980 | Gunnell, III ............ | B25B 13/48 |
|           |    |   |         |                             | 81/176.15  |
| 6,131,494 | A  | * | 10/2000 | Quenneville ........... | B25B 13/02 |
|           |    |   |         |                             | 81/176.1   |
| 6,450,069 | B1 |   | 9/2002  | Brahmbhatt                  |            |
| 10,793,262| B1 | * | 10/2020 | Nowakowski .......... | B64C 25/62 |
| 2002/0092385 | A1 |   | 7/2002  | Belcher                   |            |
| 2004/0177728 | A1 | * | 9/2004  | Hwang .................... | B25B 13/48 |
|           |    |   |         |                             | 81/176.3   |
| 2008/0128172 | A1 | * | 6/2008  | Tjader .................... | B25B 13/50 |
|           |    |   |         |                             | 175/57     |

(Continued)

FOREIGN PATENT DOCUMENTS

CN 205600631 U * 9/2016
CN 206366938 U * 8/2017

(Continued)

OTHER PUBLICATIONS

Translation of CN-207682250-U (Year: 2018).*

(Continued)

*Primary Examiner* — Matthew P Travers

(57) ABSTRACT

A tool for locking/unlocking a torsional vibration damper screw to/from a crank shaft of an engine includes an elongated tool body having a first end and a second end. The first end of the tool body includes a pair of engagement pins sized and spaced for engaging a pair of apertures in the torsional vibration damper. The second end of the tool body includes an aperture for receiving a fastener for engaging the second end to a mounting location on the engine. A spacer element can be utilized for mounting the second end of the tool body to the engine mounting location.

15 Claims, 4 Drawing Sheets

(56) References Cited

U.S. PATENT DOCUMENTS

2019/0039215 A1    2/2019  Barzelay

FOREIGN PATENT DOCUMENTS

| CN | 107717830 A    * | 2/2018  | ......... B25B 23/0085 |
|----|-------------------|---------|------------------------|
| CN | 207682250 U    * | 8/2018  |                        |
| DE | 3642198 A1    * | 5/1988  | ............ B25B 13/02 |
| DE | 102012002210 A1 * | 8/2013  | ............ F16F 15/123 |
| DE | 102018005100 A1 | 12/2018 |                        |
| DE | 202021101554 U1 | 4/2021  |                        |

OTHER PUBLICATIONS

Translation of CN-206366938-U (Year: 2017).*
U.S. Appl. No. 16/447,127, filed Jun. 20, 2019, Badellino et al.
First Office Action for German Application No. 102021112605.3, dated Jan. 19, 2022 with correspondence dated Jan. 31, 2022 from Manitz Finsterwald summarizing content, 7 pages.
First Chinese Office Action for Chinese Patent Application No. 202110514975.6 dated Apr. 12, 2023 with correspondence dated Apr. 17, 2023 from China Patent Agent (H.K.) Ltd summarizing content, 26 pages.

* cited by examiner

SAFE/FAST LOCKING/UNLOCKING TOOL FOR ENGINE TORSION VIBRATION DAMPER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a safe fast locking and unlocking tool for an engine torsion vibration damper.

The torsional vibration damper (TVD) is the pulley on the end of the crankshaft of an engine that drives the accessories such as the alternator, water pump and air conditioning compressor. The torsional vibration of an engine is a twisting vibration caused by the firing of each combustion chamber of the engine. The unlocking and locking of the screw that connects the torsional vibration damper pulley to the crankshaft typically requires two people applying a special tool. The current tool design does not provide robust reaction points and the tightening/un-tightening torque of the screw is very high.

SUMMARY

This section provides a general summary of the disclosure, and is not a comprehensive disclosure of its full scope or all of its features.

The tool of the present disclosure allows the crank shaft torsion vibration damper screw to be locked and un-locked by one person with enormous savings in time and resources compared to known methods and tools.

The tool for locking or unlocking a torsional vibration damper screw from a crank shaft of an engine includes an elongated tool body having a first end and a second end. The first end of the tool body includes a pair of engagement pins sized and spaced for engaging a pair of apertures in the torsional vibration damper. The second end of the tool body includes an aperture for receiving a fastener for engaging the second end to a mounting location on the engine. A spacer element can be utilized for mounting the second end of the tool body to the engine mounting location.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

In the drawings, reference numbers may be reused to identify similar and/or identical elements.

DETAILED DESCRIPTION

Figure 1:
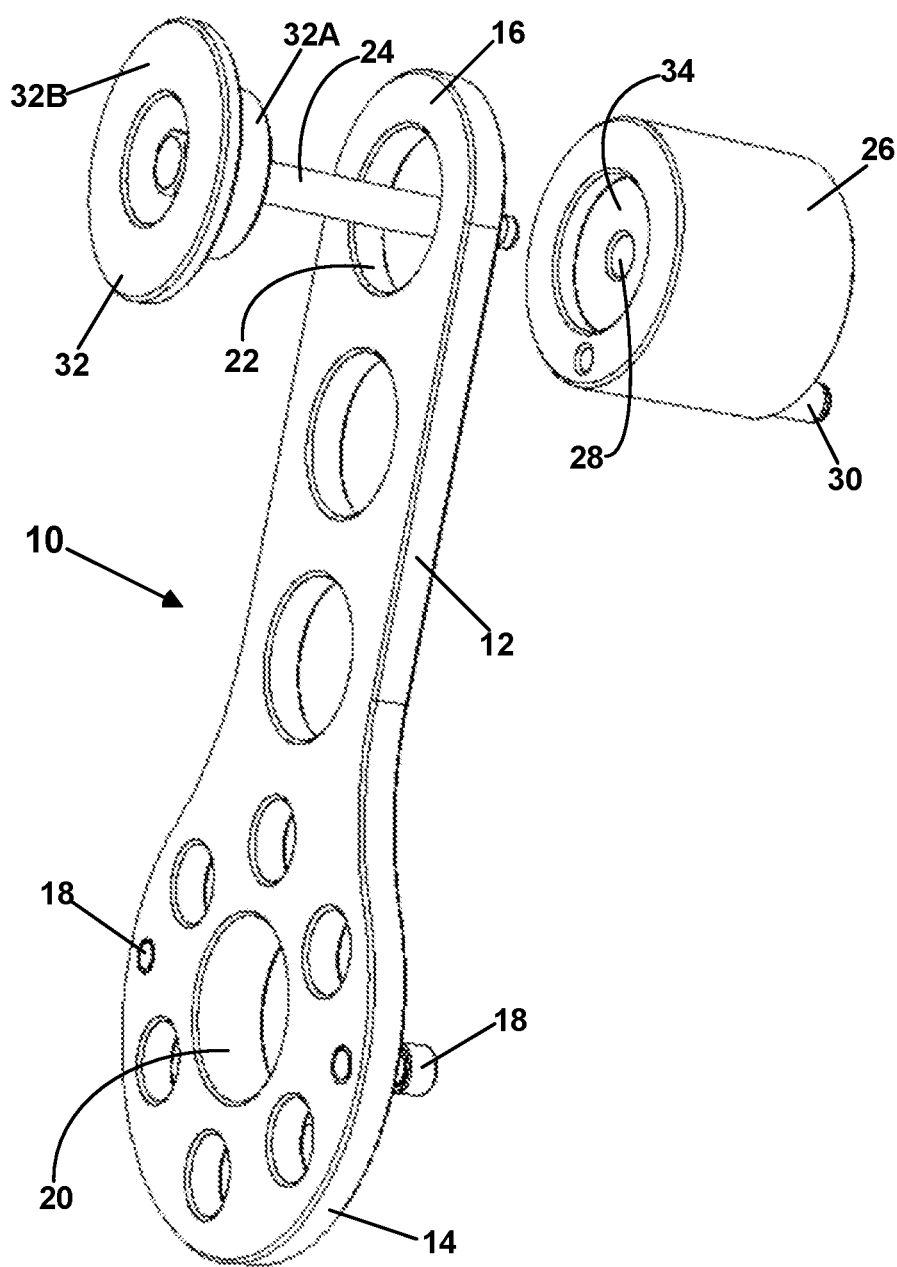
FIG. 1 is an exploded perspective view of the tool according to the principles of the present disclosure.

With reference to FIG. 1, a tool 10 is shown that is designed to be used to safely unlock and a lock a torsional vibration damper screw 48 (see FIGS. 2-4) of a crankshaft. The tool 10 includes an elongated tool body 12 having a first end 14 and a second end 16. The first end 14 includes a pair of engagement pins 18 that are sized and spaced for engaging a pair of apertures in the torsional vibration damper 46 (see FIGS. 2-4) explained hereinafter. The engagement pins 18 can be press-fit or threadedly engaged in apertures in the tool body 12 or integrally formed with the tool body 12. The first end 14 of the elongated tool body 12 further includes an open region 20 disposed between the engagement pins 18 to allow access to the torsional vibration damper screw. The open region 20 can include an aperture as shown. The second end 16 includes an aperture 22 for receiving a fastener 24 for engaging the second end 16 of the elongated tool body 12 to a mounting location 60 on the engine (see FIGS. 2-4), as described further herein.

The tool 10 can further include a spacer element 26 that can be disposed between the second end 16 of the tool body 12 and the engine mounting location 60. The spacer element 26 includes an aperture 28 for receiving the fastener 24 for mounting the spacer element 26 to the engine mounting location 60. The spacer element 26 can further include a stabilizing pin 30 that can further be received in an aperture in the engine structure. The fastener 24 can further include a centering knob 32 that includes a first diameter portion 32A received in the aperture 22 of the second end 16 of the tool body 12 and that is received in a recess 34 in the spacer element 26. The centering knob 32 includes a second larger diameter portion 32B that provides a shoulder against the tool body 12.

Figure 4:
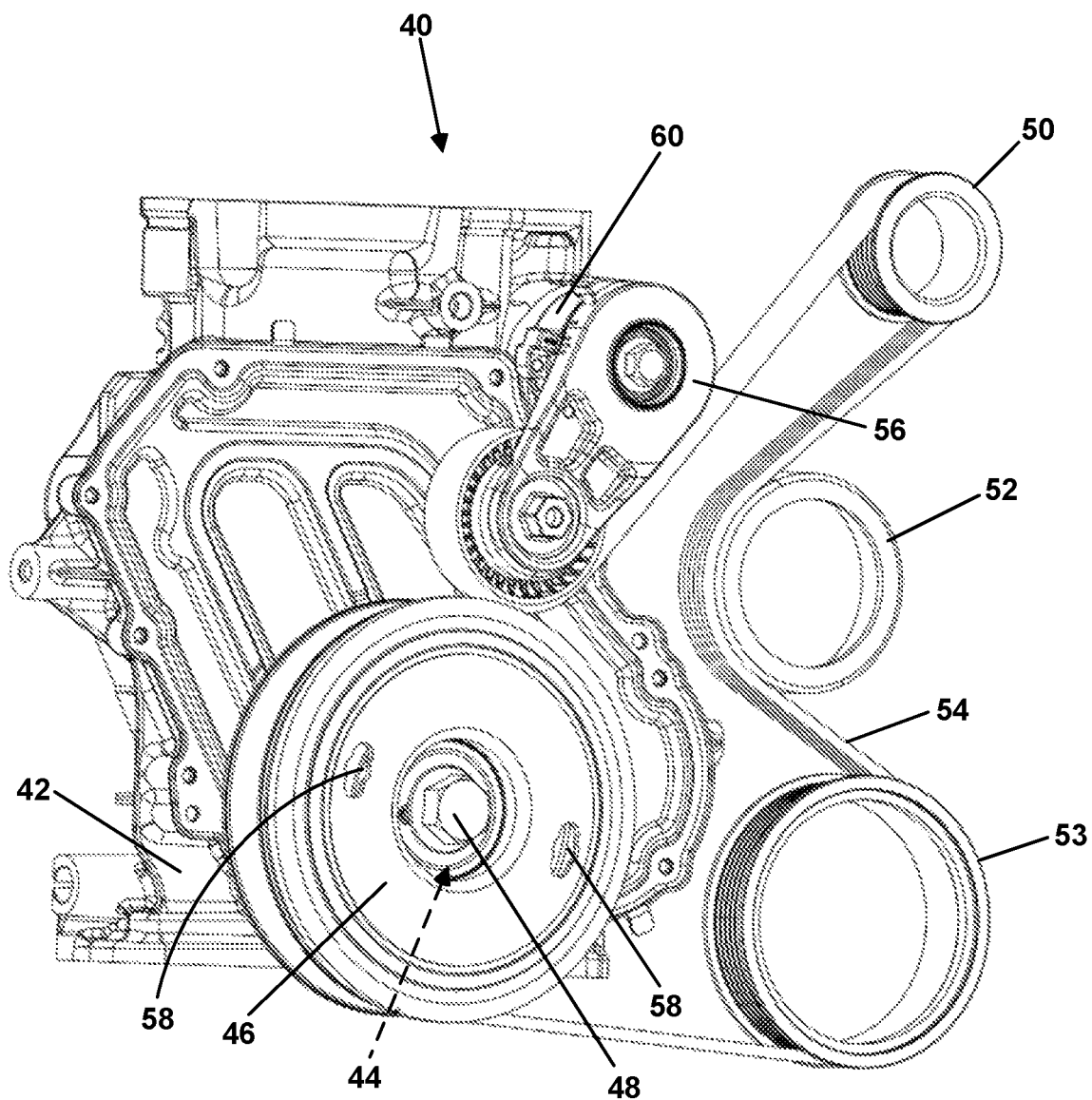
FIG. 4 is a perspective view of an exemplary engine to which the tool of the present disclosure can be applied.

With reference to FIG. 4, an exemplary engine 40 is shown including an engine structure 42. The engine structure 42 supports a crankshaft 44 and a torsional vibration damper 46 which is mounted to the crankshaft 44 by a screw 48. The torsional vibration damper 46 can be drivingly attached to an alternator pulley 50, a water pump pulley 52, an air conditioning compressor pulley 53 and other vehicle accessories by a belt 54. A belt tensioner 56 is mounted to the engine structure 42 and applies tension to the belt 54. The torsional vibration damper 46 can have a pair of apertures or slots 58 formed therein.

Figure 2:
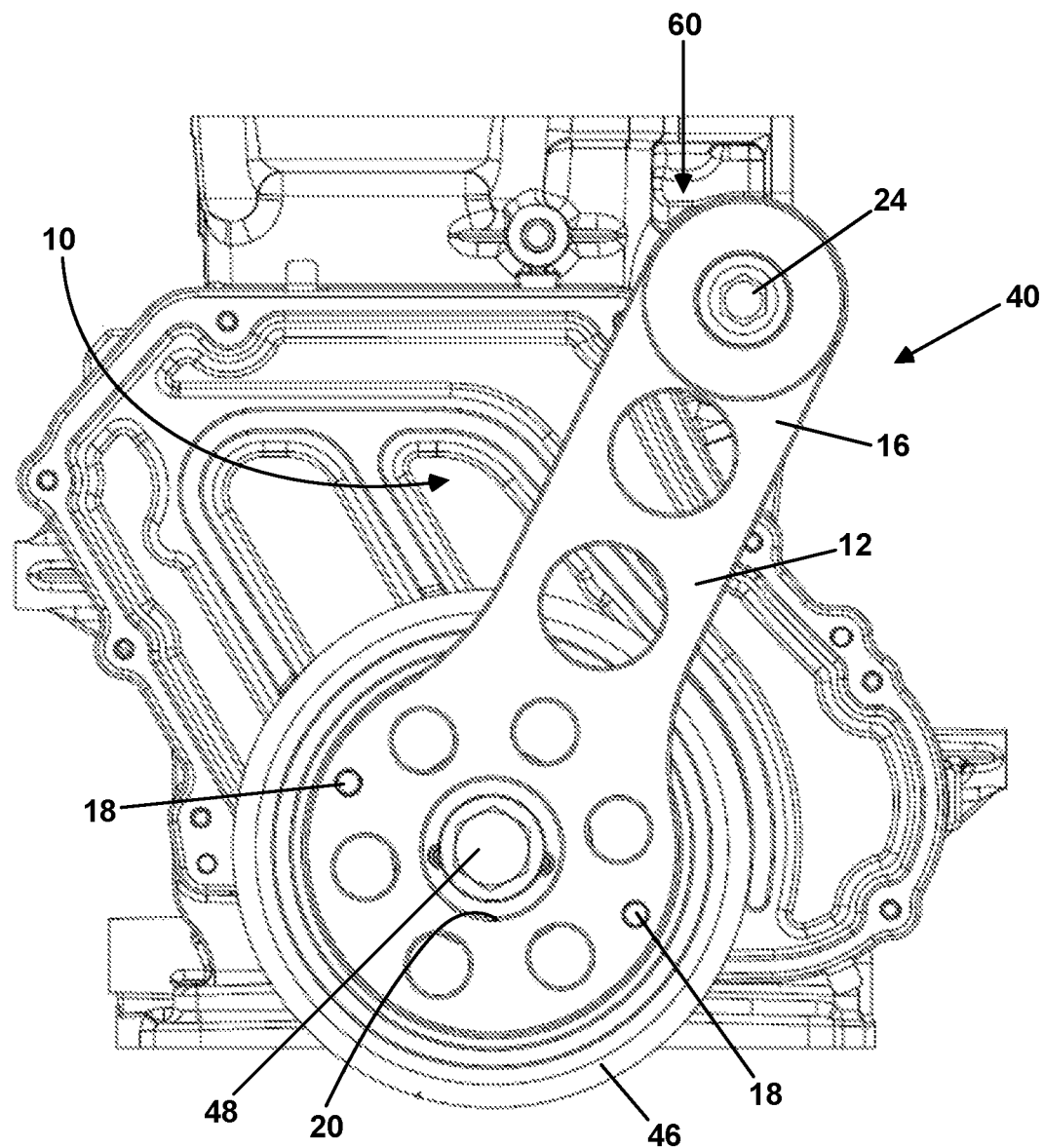
FIG. 2 is a plan view of the tool applied to an engine for unlocking/locking the torsional vibration damper screw of an engine crankshaft according to the principles of the present disclosure.
Figure 3:
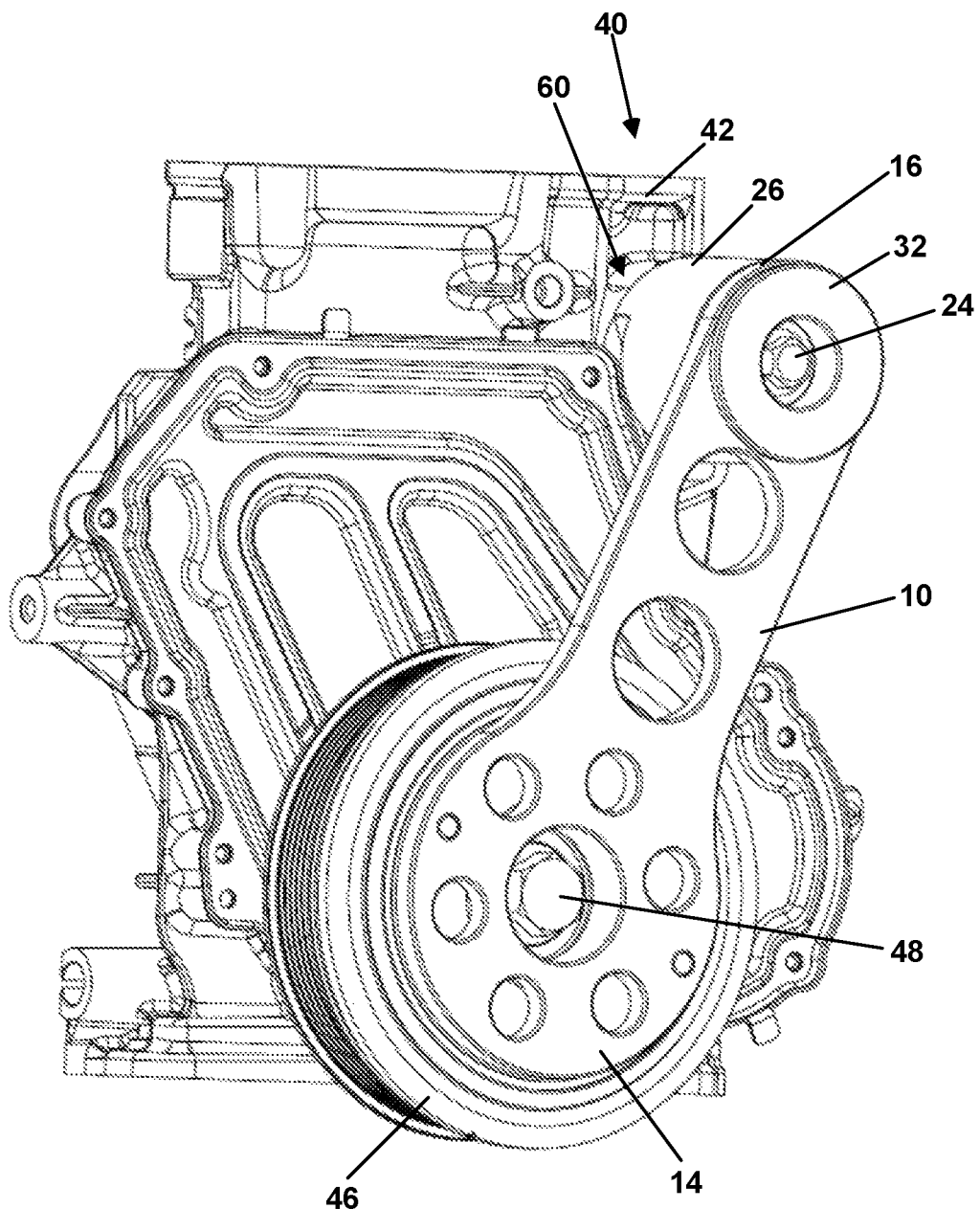
FIG. 3 is perspective view of the tool applied to an engine according to the principles of the present disclosure.

With reference to FIGS. 2 and 3, in order to mount the tool 10 to the engine structure 42, the engine 40 is shown with the belt tensioner 56 and belt 54 removed. The engagement pins 18 in the first end 14 of the tool 10 are inserted into the apertures 58 of the torsional vibration damper 46 and the second end 16 of the tool 10 is secured to the mounting location 60 of the engine structure 42. In the example shown, the mounting location 60 includes a portion of the engine structure 42 that the belt tensioner 56 is mounted to. In particular, the belt tensioner 56 can be removed from the engine structure 42 and the spacer element 26 and the second end 16 of the tool body 12 can be secured to the mounting location 60 by the fastener 24 with the stabilizing pin 30 engaging another opening 62 in the engine structure 42. It should be understood that the second end 16 of the tool 10 can be connected to other alternative mounting locations.

With the tool 10 mounted as described above, a wrench can be applied to the screw 48 to either unlock/lock the screw 48 to remove/install the torsional vibration damper 46 to/from the crankshaft 44. As torque is applied to the screw 48, the tool 10 prevents the crankshaft 44 and torsional vibration damper 46 from rotating so that the screw 48 can be locked or unlocked. As compared to previous tools that require a second person to hold the tool to prevent rotation of the crankshaft 44 and torsional vibration damper 46, the present tool 10 provides a secure and safe mounting of the tool 10 to the engine structure 42, so that the screw 48 can be safely unlocked or locked by just one person.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A tool for unlocking a torsional vibration damper screw from a crank shaft of an engine, comprising:
    an elongated tool body having a first end and a second end, the first end including a pair of engagement pins sized and spaced for engaging a pair of apertures in a torsional vibration damper, the second end including an aperture:
    a centering knob having a first diameter portion received in the aperture in the second end of the elongated tool body and the centering knob having a second diameter portion that is larger than the first diameter portion and is disposed against a face of the tool body, the centering knob included with a fastener for engaging the second end of the elongated tool body to a mounting location on the engine; and
    a spacer element disposed entirely on an opposite side of the elongated tool body from the second diameter portion of the centering knob, the spacer element having an aperture receiving the fastener for attaching the spacer element between the second end of the tool body and the engine mounting location.

2. The tool according to claim 1, wherein the first end of the elongated tool body includes an open region disposed between the engagement pins to allow access to the torsional vibration damper screw.

3. The tool according to claim 2, wherein the open region includes an aperture in the first end of the tool body.

4. The tool according to claim 1, wherein the spacer element includes a pin extending therefrom for engagement with an aperture in the engine.

5. The tool according to claim 1, wherein the pair of engagement pins are press fit in a pair of apertures in the tool body.

6. The tool according to claim 1, wherein the pair of engagement pins are threadedly engaged with a pair of threaded apertures in the tool body.

7. The tool according to claim 1, wherein the pair of engagement pins are integrally formed with the tool body.

8. A method for unlocking a torsional vibration damper screw from a crankshaft of an engine, comprising:
    engaging a pair of pins of a first end of an elongated tool body to a pair of openings in a torsional vibration damper to inhibit rotation of the torsional vibration damper;
    mounting a second end of the elongated tool body to an engine mounting location by a screw inserted through an opening in the second end of the elongated tool body and engaged with a threaded aperture in the engine mounting location;
    applying a wrench to a head of the torsional vibration damper screw and applying torque to the torsional vibration damper screw for unlocking the torsional vibration damper screw;
    placing a spacer element entirely between the second end of the tool body and the engine mounting location, wherein the spacer element includes an aperture for receiving the screw for engaging the second end to the mounting location on the engine along with the spacer element.

9. The method according to claim 8, wherein the first end of the elongated tool body includes an open region disposed between the engagement pins that is aligned with the torsional vibration damper screw.

10. The method according to claim 9, wherein the open region includes an aperture in the first end of the tool body and the torsional vibration damper screw is accessed by the wrench through the aperture.

11. The method according to claim 8, wherein the spacer element includes a pin extending therefrom and the pin is engaged with an aperture in the engine.

12. The method according to claim 8, wherein mounting the second end of the elongated tool body to the engine mounting location includes inserting a first diameter portion of a centering knob in the opening in the second end of the elongated tool body with a second diameter portion of the centering knob that is larger than the first diameter portion disposed against a face of the tool body, the centering knob included with the screw for engaging the second end of the elongated tool body to the mounting location on the engine.

13. A method for unlocking a torsional vibration damper screw from a crankshaft of an engine, comprising;

engaging a pair of pins of a first end of an elongated tool body to a pair of openings in a torsional vibration damper to inhibit rotation of the torsional vibration damper;

mounting a second end of the elongated tool body to an engine mounting location including inserting a first diameter portion of a centering knob in an aperture in the second end of the elongated tool body with a second diameter portion of the centering knob that is larger than the first diameter portion disposed against a first face of the tool body, the first face being planar and extending from the first end to the second end of the elongated tool body, the centering knob included with a fastener and the fastener being engaged with a threaded aperture in the engine mounting location;

applying a wrench to a head of the torsional vibration damper screw and applying torque to the torsional vibration damper screw for unlocking the torsional vibration damper screw.

14. The method according to claim 13, wherein the first end of the elongated tool body includes an open region disposed between the engagement pins that is aligned with the torsional vibration damper screw.

15. The method according to claim 14, wherein the open region includes an aperture in the first end of the tool body and the torsional vibration damper screw is accessed by the wrench through the aperture.

\* \* \* \* \*